(12) United States Patent
Sawa et al.

(10) Patent No.: US 10,163,201 B2
(45) Date of Patent: Dec. 25, 2018

(54) HARDNESS TEST APPARATUS AND HARDNESS TESTING METHOD

(71) Applicant: MITUTOYO CORPORATION, Kanagawa (JP)

(72) Inventors: Takeshi Sawa, Kawasaki (JP); Takashi Hanamura, Kawasaki (JP); Akira Takada, Yokohama (JP); Takuho Maeda, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 100 days.

(21) Appl. No.: 15/251,324

(22) Filed: Aug. 30, 2016

(65) Prior Publication Data

US 2017/0076436 A1     Mar. 16, 2017

(30) Foreign Application Priority Data

Sep. 10, 2015  (JP) ................................. 2015-178033

(51) Int. Cl.
| | | |
|---|---|---|
| *G06T 7/00* | (2017.01) | |
| *G06F 17/30* | (2006.01) | |
| *G06K 9/62* | (2006.01) | |
| *G06T 1/00* | (2006.01) | |

(52) U.S. Cl.
CPC ........ *G06T 7/001* (2013.01); *G06F 17/30259* (2013.01); *G06K 9/6201* (2013.01); *G06K 9/6215* (2013.01); *G06T 1/0007* (2013.01); *G06K 2009/6213* (2013.01); *G06K 2209/19* (2013.01); *G06K 2209/25* (2013.01); *G06T 2207/30164* (2013.01)

(58) Field of Classification Search
CPC .......... G06T 2207/30164; G06T 7/001; G06T 7/0004; G06T 1/0007; G06K 2009/6213; G06K 2209/19; G06K 9/6201; G06K 9/6215

See application file for complete search history.

(56) References Cited

U.S. PATENT DOCUMENTS

| | | | | |
|---|---|---|---|---|
| 5,146,779 | A * | 9/1992 | Sugimoto ................ | G01N 3/40 356/626 |
| 5,284,049 | A * | 2/1994 | Fukumoto ................ | G01N 3/42 73/82 |
| 8,566,735 | B2 | 10/2013 | Takemura et al. | |

(Continued)

FOREIGN PATENT DOCUMENTS

JP          2012-78306          4/2012

*Primary Examiner* — Jingge Wu
(74) *Attorney, Agent, or Firm* — Greenblum & Bernstein, P.L.C.

(57) ABSTRACT

A hardness tester includes a memory associating and storing a parts program having defined measurement conditions with respect to a sample, including a test position, and an image file acquired by capturing an image of the shape of the sample; an image acquirer acquiring image data of the sample to be measured; a pattern matcher performing a pattern matching process on the image data of the sample using the image file associated with the parts program; a determiner determining whether an image file exists which has a shape related to the image data of the sample; a retriever retrieving the parts program associated with the image file having a related shape; and a measurer measuring hardness of the sample based on the retrieved parts program.

6 Claims, 6 Drawing Sheets

(56) References Cited

U.S. PATENT DOCUMENTS

| | | | | |
|---|---|---|---|---|
| 2004/0096093 A1* | 5/2004 | Hauck | .................. | G01N 3/08 |
| | | | | 382/141 |
| 2004/0134263 A1* | 7/2004 | Tsujii | .................. | G01N 3/42 |
| | | | | 73/81 |
| 2012/0087567 A1* | 4/2012 | Takemura | ............... | G01N 3/42 |
| | | | | 382/141 |
| 2014/0177937 A1* | 6/2014 | Ariga | .................. | G01N 3/068 |
| | | | | 382/141 |

* cited by examiner

HARDNESS TEST APPARATUS AND HARDNESS TESTING METHOD

CROSS-REFERENCE TO RELATED APPLICATIONS

The present application claims priority under 35 U.S.C. § 119 of Japanese Application No. 2015-178033, filed on Sep. 10, 2015, the disclosure of which is expressly incorporated by reference herein in its entirety.

BACKGROUND OF THE INVENTION

1. Field of the Invention

The present invention relates to a hardness tester and to a hardness testing method.

2. Description of Related Art

A conventional hardness tester is known which measures hardness of a sample based on dimensions of an indentation formed by pressing an indenter against the sample (work piece) with a predetermined test force. For example, a Vickers hardness tester measures a length of diagonal lines of an indentation formed by pressing a quadrangular pyramidal indenter into a surface of the sample, and calculates hardness based on the measured length of the diagonal lines of the indentation (see, for example, Japanese Patent Laid-open Publication No. 2012-78306).

In recent years, the above-noted hardness tester has employed a parts program which enables identical replication of a hardness test by logging a procedure of a hardness test performed once as the parts program. Together with a measurement procedure, the parts program logs, in addition to a test position, manually defined measurement conditions such as data on the indenter to be used (placement of a turret, shape of the indenter) and the test force. The parts program is effective particularly when testing a plurality of samples having an identical shape. Ordinarily, an operator manages the parts program by assigning a name enabling identification of the sample to a file name of the parts program.

However, in a case where the above administration method is employed with the parts program, the greater the number of sample types to be handled becomes, the more the number of parts programs increases and therefore the more difficult assigning identifiable names becomes, complicating file management. This may cause the operator to make a mistaken selection when selecting the parts program corresponding to a sample, negatively impacting usability.

The present invention provides a hardness tester and a hardness testing method that enable reduction in costs of administrating parts programs while improving usability.

SUMMARY OF THE INVENTION

In order to resolve the above-noted issue, one aspect of the present invention is a hardness tester measuring hardness of a sample by loading a predetermined test force on a surface of the sample with an indenter to form an indentation, and measuring dimensions of the indentation. The hardness tester includes a memory associating and storing a parts program having defined measurement conditions with respect to the sample, including a test position, with an image file obtained by capturing, using an image capturer, an image of a shape of the sample, for which the parts program has been created. The hardness tester also includes: an image acquirer acquiring image data of the sample to be measured; a pattern matcher performing a pattern matching process on the image data of the sample acquired by the image acquirer, the pattern matcher performing the pattern matching process using the image file associated with the parts program stored in the memory; a determiner which, as a result of the pattern matching process of the pattern matcher, determines whether an image file exists which has a shape related to the image data of the sample acquired by the image acquirer; a retriever which, in a case where the determiner determines that there is an image file having a related shape, retrieves the parts program associated with the image file from the memory; and a measurer which, based on the parts program retrieved by the retriever, performs hardness testing on the sample to be measured and measures the hardness of the sample.

According to another aspect of the present invention, the determiner determines whether an image file exists having a shape matching the image data of the sample acquired by the image acquirer and, in a case where the determiner determines that there is an image file having a matching shape, the retriever retrieves the parts program associated with the image file from the memory.

According to another aspect of the present invention, in a case where there is an image file having a similar shape to the image data of the sample acquired by the image acquirer, the determiner determines that an image file exists having a matching shape.

According to another aspect of the present invention, in a case where the determiner determines that there are a plurality of image files having a related shape, the retriever retrieves from the memory a parts program selected by an operator from among the parts programs associated with each of the plurality of image files.

According to another aspect of the present invention, in a case where there are a plurality of image files having a related shape to the image data of the sample acquired by the image acquirer, the determiner determines whether an image file having related sample data other than shape about the sample exists among the plurality of image files and, in a case where the determiner determines that there is an image file having related sample data other than shape about the sample, the retriever retrieves the parts program associated with the image file from the memory.

According to another aspect of the present invention, a hardness testing method of the hardness tester measures hardness of the sample by loading a predetermined test force on the surface of the sample with the indenter to form the indentation, then measures dimensions of the indentation. The hardness testing method includes image acquisition acquiring image data of the sample to be measured; pattern matching performing the pattern matching process on the image data of the sample acquired in the image acquisition, the pattern matching performing the pattern matching process using the image file associated with the parts program having measurement conditions including test position defined with respect to the sample; determination determining, as a result of the pattern matching process performed in the pattern matching, whether an image file exists which has a shape related to the image data of the sample acquired in the image acquisition; retrieval retrieving the parts program associated with the image file when the determination determines there is an image file having a related shape; and measurement performing hardness testing on the sample to be measured based on the parts program retrieved in the retrieval, and measuring the hardness of the sample.

According to the present invention, costs of administrating parts programs can be reduced and usability can be improved.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
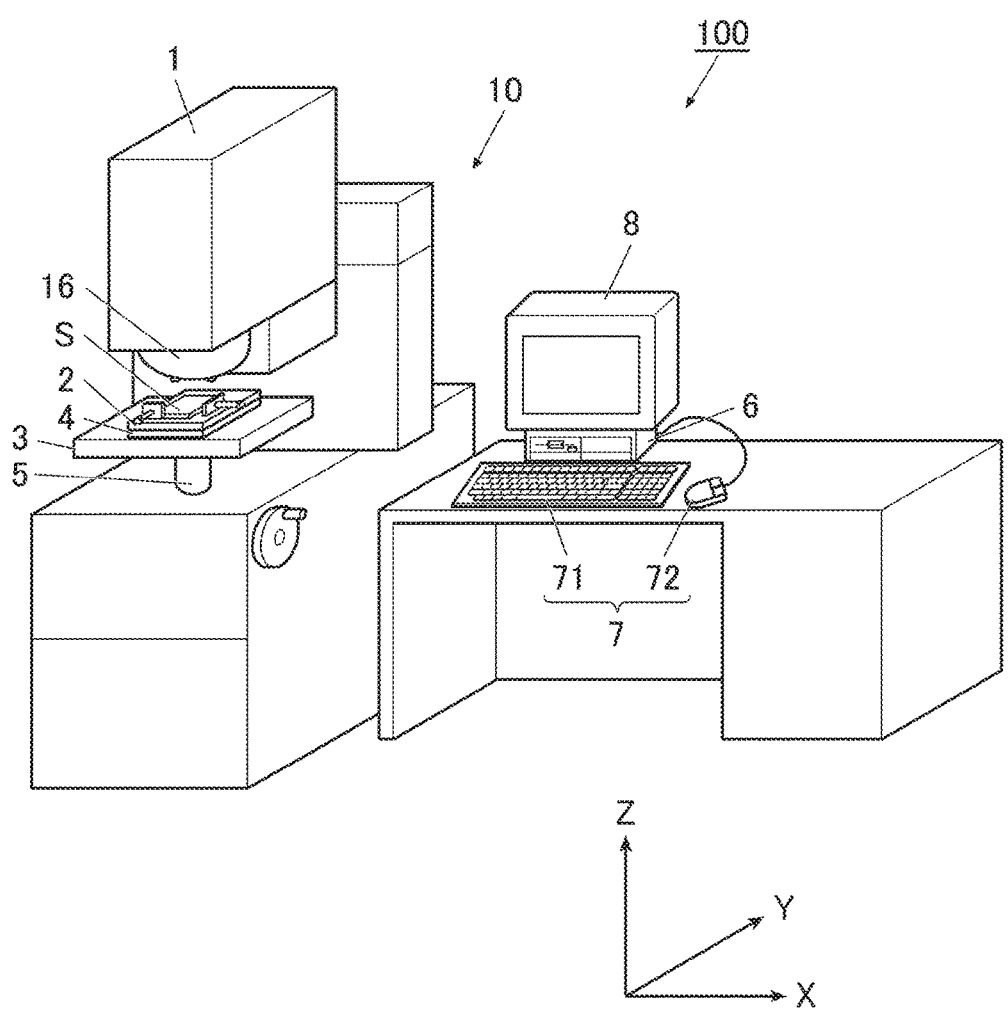
FIG. 1 is a perspective view illustrating an overall configuration of a hardness tester according to the present invention.

An embodiment of the present invention is described in detail below with reference to the drawings. Moreover, in the following description, an X direction is a left-right direction, a Y direction is a front-back direction, and a Z direction is an up-down direction in FIG. 1. In addition, an X-Y plane is a horizontal plane.

A hardness tester 100 is a Vickers hardness tester, for example, that includes an indenter 14a (see FIG. 3) having a square planar shape. As shown in FIGS. 1 to 4, the hardness tester 100 is configured to include a tester main body 10, a controller 6, a console 7, and a monitor 8.

Figure 2:
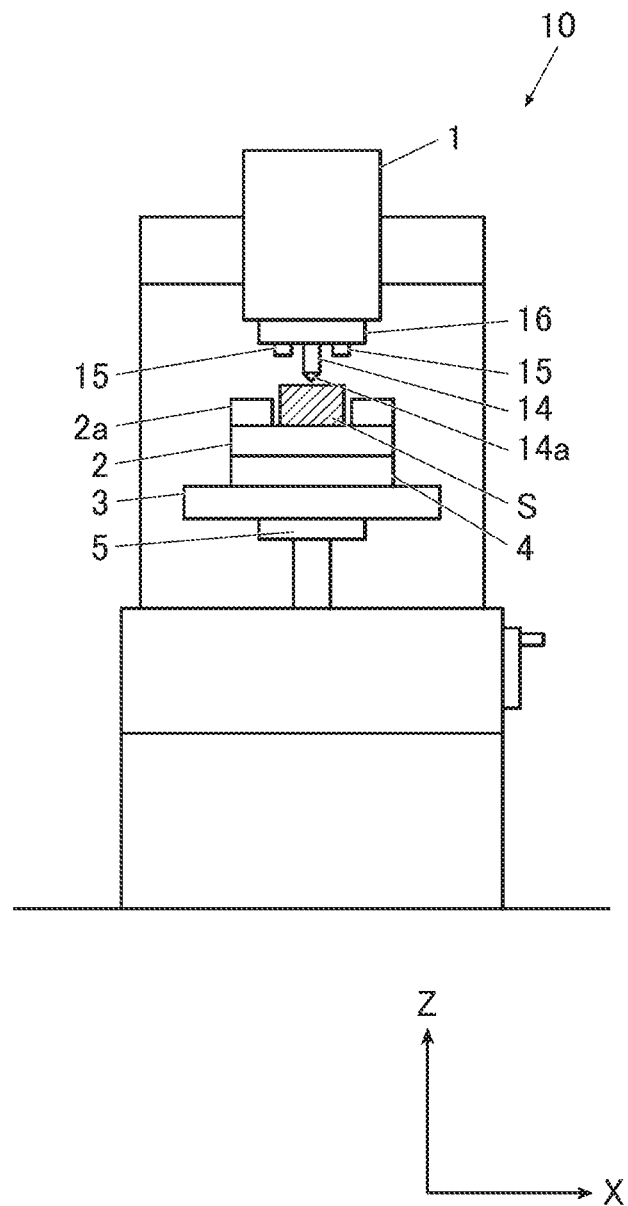
FIG. 2 is a schematic view illustrating a tester main body of the hardness tester according to the present invention.

As shown in FIG. 2, the tester main body 10 includes a hardness measurer 1 measuring hardness of a sample S; a sample stage 2 on which the sample S is placed; an XY stage 3 displacing the sample stage 2; an AF stage 4 enabling focusing on a surface of the sample S; and an elevator mechanism 5 raising and lowering the sample stage 2 (the XY stage 3 and the AF stage 4).

Figure 3:
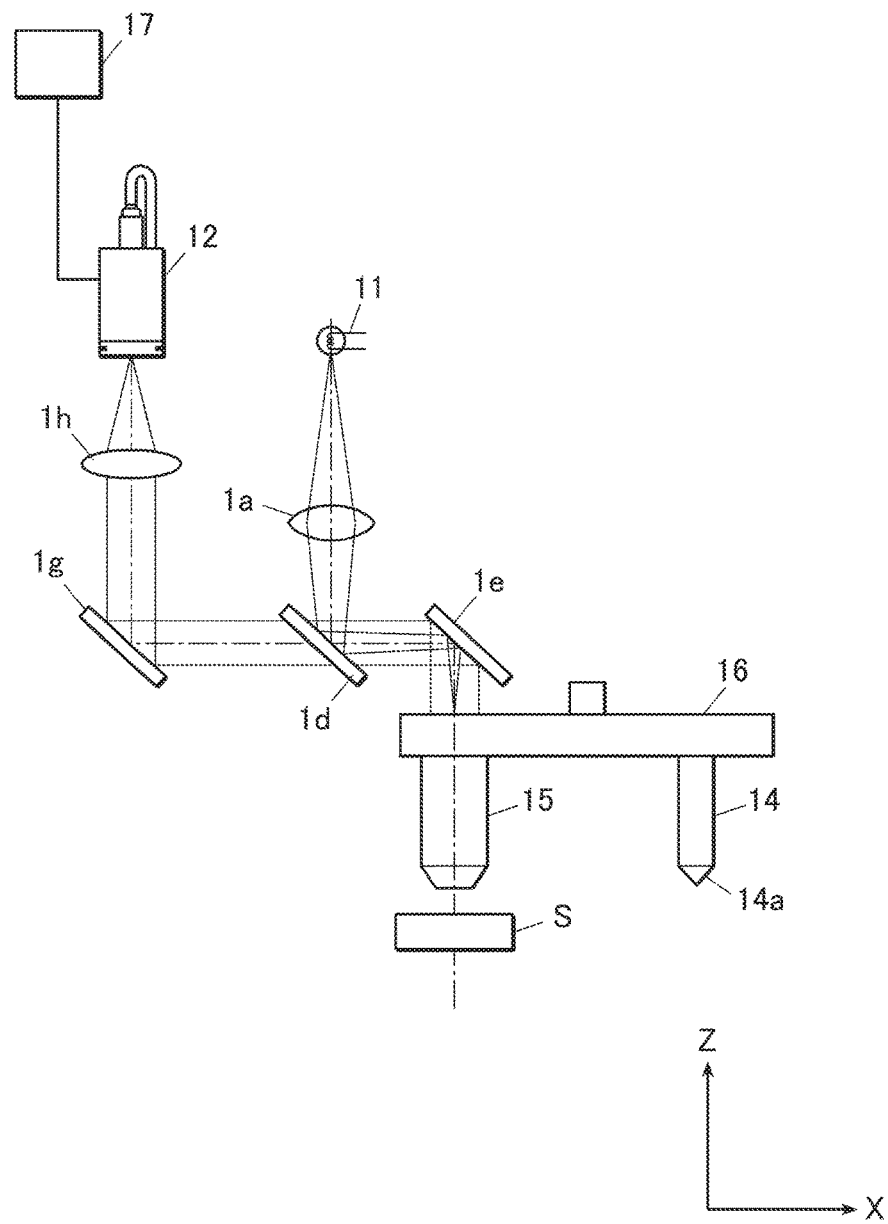
FIG. 3 is a schematic view illustrating a hardness measurer of the hardness tester according to the present invention.

As shown in FIG. 3, the hardness measurer 1 is configured with an illuminating device 11 illuminating the surface of the sample S; a CCD camera 12 capturing an image of the surface of the sample S; and a turret 16. The turret 16 includes an indenter column 14, which includes the indenter 14a, and a field lens 15. The turret 16 is capable of switching between the indenter column 14 and the field lens 15 by rotating.

The illuminating device 11 shines a light to illuminate the surface of the sample S. The light shone by the illuminating device 11 reaches the surface of the sample S via a lens 1a, a half mirror 1d, a mirror 1e, and the field lens 15.

Based on reflected light input from the surface of the sample S via the field lens 15, the mirror 1e, the half mirror 1d, a mirror 1g, and a lens 1h, the CCD camera 12 obtains image data by capturing an image of the surface of the sample S as well as an indentation formed in the surface of the sample S by the indenter 14a. The CCD camera 12 then outputs the acquired image data to the controller 6 via a frame grabber 17, which is capable of simultaneously accumulating and storing a plurality of frames of image data. Thus, the CCD camera 12 is an image capturer in the present invention.

The indenter column 14 is displaced toward the sample S placed on the sample stage 2 by a load mechanism (not shown in the drawings), which is driven in response to a control signal output by the controller 6. The indenter 14a, provided on a forefront end of the indenter column 14, is pressed against the surface of the sample S with a predetermined test force. The present embodiment uses a quadrangular pyramidal Vickers indenter (with opposing angles of 136±0.5°) as the indenter 14a.

The field lens 15 is a collective lens, each lens being configured with a different magnification. A plurality of the field lenses 15 are retained on a bottom surface of the turret 16. The field lens 15 is situated above the sample S by rotating the turret 16. Thereby, the light shone by the illuminating device 11 uniformly illuminates the surface of the sample S.

The turret 16 is configured to enable the indenter column 14 and the plurality of field lenses 15 to be attached to the bottom surface thereof. The turret 16 is also configured to be capable of positioning any one of the indenter column 14 and the plurality of field lenses 15 above the sample S by rotating the turret 16 centered around a Z-axis direction. Specifically, the indentation can be formed in the surface of the sample S by positioning the indenter column 14 above the sample S, and the formed indentation can be observed by positioning the field lenses 15 above the sample S.

The sample S is placed on an upper surface of the sample stage 2 and is fixed in place with a sample holder 2a. The XY stage 3 is driven by a drive mechanism (not shown in the drawings) driven in response to a control signal output by the controller 6. The XY stage 3 then displaces the sample stage 2 in a direction (X and Y directions) perpendicular to a displacement direction (Z direction) of the indenter 14a. The AF stage 4 is driven in response to the control signal output by the controller 6. The AF stage 4 then minutely raises and lowers the sample stage 2 based on the image data captured by the CCD camera 12 to focus on the surface of the sample S. The elevator mechanism 5 is driven in response to the control signal output by the controller 6. The elevator mechanism 5 then changes a relative distance between the sample stage 2 and the field lens 15 by displacing the sample stage 2 (the XY stage 3 and the AF stage 4) in the Z direction.

The console 7 is configured with a keyboard 71 and a mouse 72. The console 7 receives an operation input by an operator during a hardness test. In addition, when the console 7 receives a predetermined input operation performed by the operator, a predetermined operation signal corresponding to the input operation is generated and output to the controller 6. Specifically, the console 7 receives an operation in which the operator selects a condition determining a focus position of the indentation. The console 7 also receives an operation in which the operator designates a range of displacement (a range of relative distance between the sample stage 2 and the field lens 15) of the sample stage 2 (the elevator mechanism 5 and the AF stage 4). In addition, the console 7 receives an operation in which the operator inputs a test condition value to be used when carrying out the hardness test with the hardness tester 100. The input test condition value is transmitted to the controller 6. Herein, the test condition value is a value such as a material of the sample S, a test force (N) loaded on the sample S by the indenter 14a, or a magnification power of the field lens 15, for example. In addition, the console 7 receives an operation in which the operator selects one of a manual mode, in which the focus position of the indentation is manually determined, and an automatic mode, in which the determination is made automatically. The console 7 also receives an operation in which the operator programs a test position to be used when carrying out the hardness test.

The monitor 8 is configured by a display device such as an LCD, for example. The monitor 8 displays, for example, hardness test settings input on the console 7, results of the hardness test, and an image of the surface of the sample S and the indentation formed in the surface of the sample S captured by the CCD camera 12.

Figure 4:
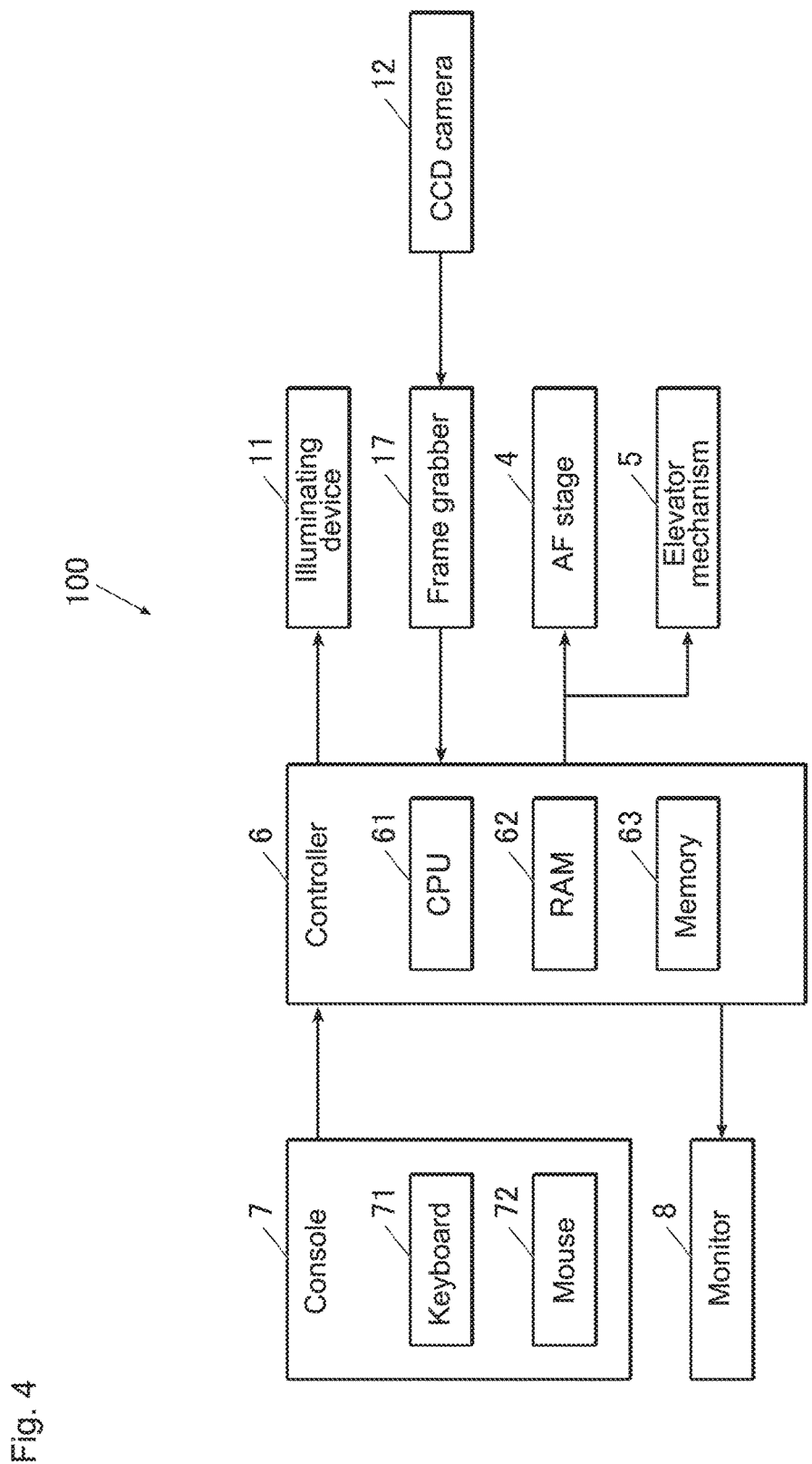
FIG. 4 is a block diagram illustrating a control structure of the hardness tester according to the present invention.

As shown in FIG. 4, the controller 6 is configured to include a CPU 61, a RAM 62, and a memory 63. The controller 6 performs operation control of performance of a predetermined hardness test by executing a predetermined program stored in the memory 63.

The CPU 61 retrieves a processing program stored in the memory 63, then opens and executes the processing program in the RAM 62, thereby performing overall control of the hardness tester 100. The RAM 62 opens the processing program executed by the CPU 61 in a program storage region within the RAM 62 and stores in a data storage region input data, processing results generated during execution of the processing program, and the like. The memory 63 includes, for example, a recording medium (not shown in the drawings) storing a program, data, and the like. The recording medium is configured with a semiconductor memory, for example. In addition, the memory 63 stores various kinds of data, various kinds of processing programs, and data processed by running the programs that allow the CPU 61 to perform overall control of the hardness tester 100. The memory 63 also associates and stores a parts program having defined measurement conditions with respect to the sample S, including the test position, with an image file obtained by capturing, using the CCD camera 12, an image of the shape of the sample S, for which a parts program has been created.

Next, operations of the hardness tester 100 according to the present embodiment are described. First, a process of the operator creating and registering the parts program is described. The operator first defines a desired test pattern (test position) relative to the sample S to be measured and defines other measurement conditions (indenter information, test force, and the like) to create the parts program. Next, using the CCD camera 12, the operator captures an image of an overall shape or a characteristic shape of the sample S for which the parts program has been created and stores the acquired image data of the sample S in the memory 63 as an image file. The operator then associates the created parts program with the image file and stores the parts program in the memory 63. Thus, the memory 63 is a memory in the present invention. The above completes a parts program registration process.

Next, a process of retrieving the parts program corresponding to the sample S to be measured and measuring hardness in the hardness tester 100 according to the present embodiment is described with reference to a flow chart in FIG. 5. This process is initiated when an instruction operation by the operator to initiate automatic testing is detected.

First, using the CCD camera 12, the CPU 61 of the controller 6 captures an image of the overall shape or a characteristic shape of the sample S to be measured placed on the sample stage 2 by the operator and acquires image data of the sample S (step S101: image acquisition). Specifically, the CPU 61 is an image acquirer in the present invention. In the present embodiment, a star-shaped sample S (see FIG. 6) is placed on the sample stage 2 as the sample S to be measured. Specifically, in step S101, the image data of the star-shaped sample S is acquired.

Next, the CPU 61 executes a command to read the parts program corresponding to the sample S for which image data was acquired in step S101 (step S102).

Next, the CPU 61 performs a pattern matching process on the image data of the sample S acquired in step S101. The CPU 61 performs the pattern matching process using the image files associated with the parts program stored in the memory 63 (step S103: pattern matching). Specifically, the CPU 61 is a pattern matcher in the present invention.

Next, as a result of the pattern matching process of step S103, the CPU 61 determines whether an image file exists which has a shape matching the image data of the sample S acquired in step S101 (step S104: determination). Specifically, the CPU 61 is a determiner in the present invention. In a case where the CPU 61 determines that an image file having a matching shape exists (step S104: YES), the CPU 61 proceeds to the next step, S105. Meanwhile, in a case where the CPU 61 determines that an image file having a matching shape does not exist (step S104: NO), an error display indicating that there is no parts program corresponding to the sample S to be measured is displayed on the monitor 8 (step S107), and the process ends.

Figure 6:
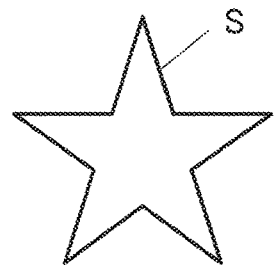
FIG. 6 illustrates an exemplary sample to be measured.
Figure 7:
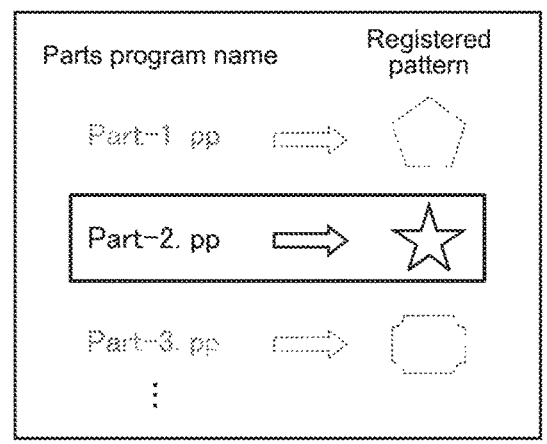
FIG. 7 illustrates an exemplary format identifying a parts program associated with an image file having a shape which matches the sample to be measured.

Next, the CPU 61 retrieves from the memory 63 the parts program associated with the image file determined in step S104 to have a matching shape (step S105: retrieval). Specifically, the CPU 61 is a retriever in the present invention. In the present embodiment, as shown in FIG. 7, the parts program (Part-2.pp) associated with the image file of the star-shaped sample S shown in FIG. 6 is retrieved.

Next, based on the parts program retrieved in step S105, the CPU 61 performs hardness testing on the sample S to be measured and measures the hardness of the sample S (step S106: measurement). The hardness testing is, more specifically, a process measuring the hardness of the sample S by loading a predetermined test force with the indenter 14a to form an indentation in each test position on the surface of the sample S, then measuring dimensions of the indentations. Specifically, the CPU 61 is a measurer in the present invention. With the above-noted process, the parts program corresponding to the sample S to be measured can be read out and hardness can be measured.

In the above description, the hardness tester 100 according to the present invention includes: the memory (memory 63) associating and storing the parts program having defined measurement conditions with respect to the sample S, including the test position, and the image file acquired by capturing, with the image capturer/camera (CCD or other type of camera 12), an image of the shape of the sample S for which the parts program is created; the image acquirer (CPU 61) acquiring the image data of the sample S to be measured; the pattern matcher (CPU 61) performing the pattern matching process on the image data of the sample S acquired by the image acquirer, the pattern matcher performing the pattern matching process using the image file associated with the parts program stored in the memory; the determiner (CPU 61) determining, as a result of the pattern matching process performed by the pattern matcher, whether an image file exists which has a shape related to the image data of the sample acquired by the image acquirer; the retriever (CPU 61) retrieving from the memory the parts program associated with the image file when the image file is determined by the determiner to have a related shape; and the measurer (CPU 61) performing hardness testing on the sample S to be measured based on the parts program retrieved by the retriever, and measuring the hardness of the sample S. Accordingly, with the hardness tester 100 of the present embodiment, the parts program corresponding to the sample S to be measured can be automatically selected and the hardness of the sample S measured. Therefore, a necessity to identify the parts program with a file name becomes unnecessary and administration costs can be reduced. In addition, mistaken selections of parts programs by the operator, for example, can be inhibited and usability can be improved.

In particular, according to the hardness tester 100 of the present embodiment, the determiner determines whether an image file exists having a shape matching the image data of the sample acquired by the image acquirer and, in a case where the determiner determines that there is an image file having a matching shape, the retriever retrieves the parts program associated with the image file from the memory. Accordingly, a parts program reliably corresponding to the sample S to be measured is selected, and therefore mistaken selection of a parts program can be inhibited and a faulty hardness measurement associated with the mistaken selection of the parts program can be inhibited.

In the above, a concrete description is given based on an embodiment according to the present invention. However, the present invention is not limited to the above-described embodiment and can be modified without deviating from the scope of the invention.

Figure 5:
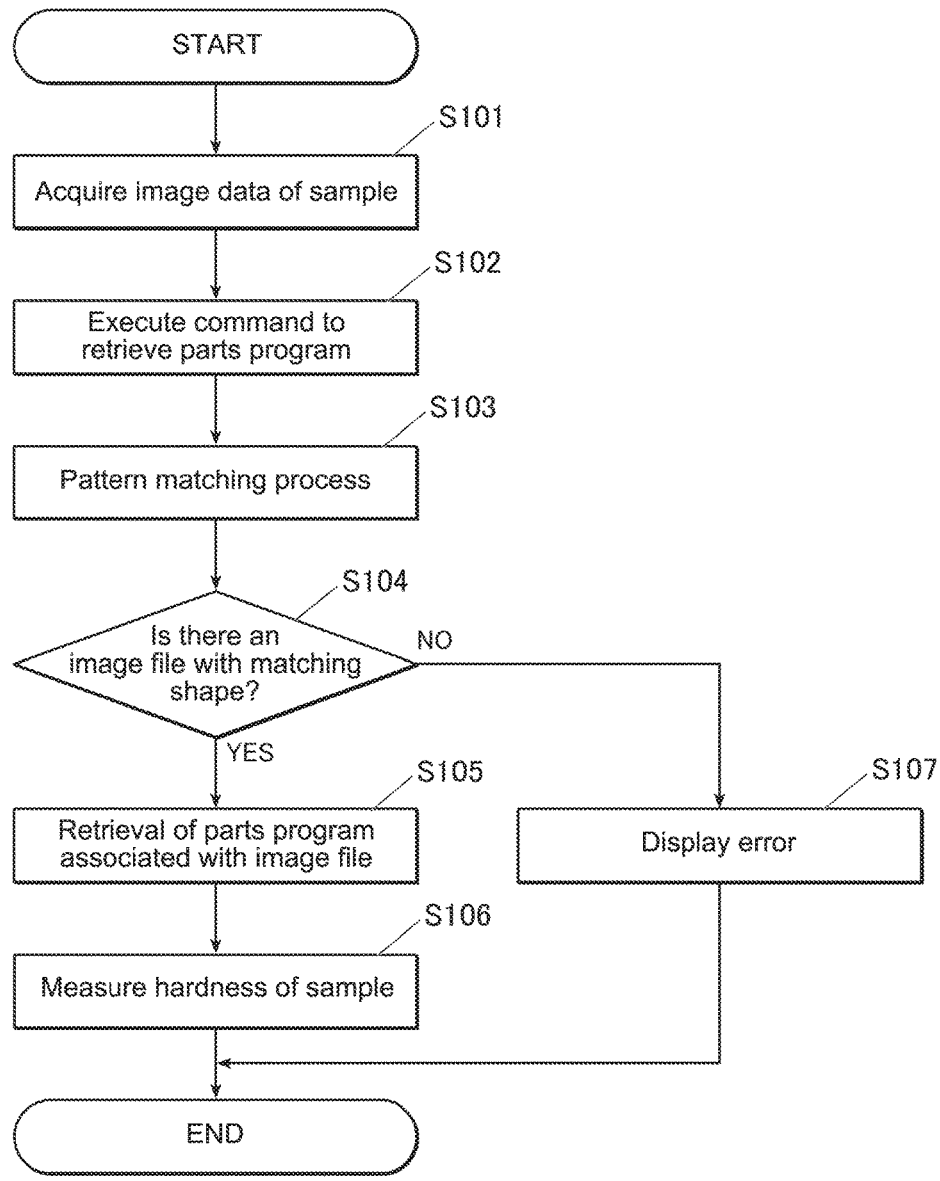
FIG. 5 is a flow chart illustrating a process of the hardness tester according to the present invention, in which a parts program corresponding to a sample of a measured object is retrieved and hardness is measured.

For example, the above embodiment is configured to retrieve the parts program associated with the image file determined to have a matching shape in step S104 of FIG. 5. However, the present invention is not limited to this. For example, an image file having a shape similar to that of the image data of the sample acquired in step S101 may be treated as an image file determined to have a matching shape, and the parts program associated with the image file having the similar shape may be retrieved. Accordingly, parts programs associated with each of a plurality of image files in which the same shape differs in size may be collected into a single parts program, and therefore a number of parts programs to be managed can be reduced and costs associated with administration can be further reduced.

Figure 8:
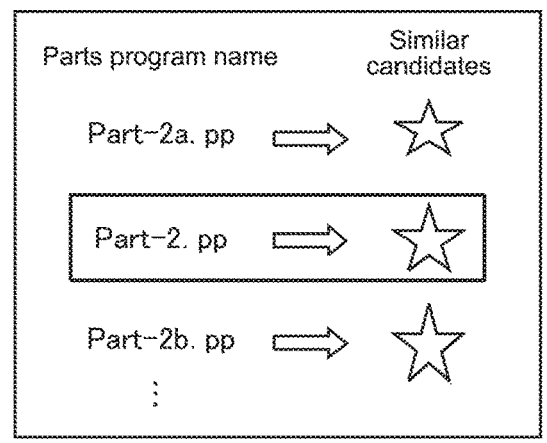
FIG. 8 illustrates an exemplary format where a plurality of parts programs associated with an image file having a shape related to that of the sample to be measured are extracted.

Also, the process may be configured to extract not only a parts program associated with an image file determined to have a matching shape, but may also extract, as a candidate, a parts program associated with an image file determined to have a similar shape. Specifically, the process may be configured to extract, as a candidate, a parts program associated with an image file determined to have a related shape. In the present invention, the term "related shape" includes cases where a shape is similar, in addition to cases where the shape matches. For example, as shown in FIG. 8, parts programs (Part-2a.pp, Part-2.pp, and Part-2b.pp) respectively associated with a plurality of image files determined to have a shape related to that of the star-shaped sample S shown in FIG. 6 may be extracted as candidates and selected by the operator. FIG. 8 shows Part-2.pp as selected. When a parts program selection screen is displayed on the monitor 8, the display may be configured to show only a name of the parts program, and may also be configured to show only an image file (the shape of the sample S). In addition, the display may be configured to simultaneously display both the parts program name and the image file. Displaying the parts program selection screen on the monitor 8 enables the operator to intuitively select the parts program. As noted above, in a case where there are a plurality of image files determined to have related shapes, by retrieving the parts program selected by the operator, situationally appropriate handling is possible even in a case where differentiation between fine details of the sample S is difficult using the images, and efficiency of a measurement task can be improved.

In addition, in a case where there are a plurality of image files determined to have related shapes, a parts program may be retrieved which is associated with, out of the plurality of image files, an image file having additional related information about the sample S (sample data) which is sample data other than a shape that can be differentiated based on the image (such as color or material). In order to enable accurate identification of material based on images, when the image file of the sample S is associated with the parts program, or when the image data of the sample S placed on the sample stage 2 is acquired, a marking may be provided on the surface of the sample S such as a material name or a tag enabling identification of the material. In addition, in a case where there are a plurality of image files having related sample data other than shape, the process may be configured to extract, as candidates, parts programs associated with each of the plurality of image files and to prompt selection by the operator. Accordingly, a parts program corresponding to the sample S to be measured can be selected with a high degree of accuracy and therefore, mistaken selection of a parts program can be inhibited and a faulty hardness measurement associated with the mistaken selection of the parts program can be inhibited.

In addition, the above embodiment is configured such that an image of the overall shape or a characteristic shape of the sample S to be measured is captured by the CCD camera 12 and image data of the sample S is obtained. However, the present invention is not limited to this. For example, the image data of the sample S to be measured may be stored in an external memory ahead of time and the image data of the sample S to be measured may be retrieved and acquired from the external memory when performing the pattern matching process.

In addition, in the above-described embodiment, a Vickers hardness tester is described to exemplify the hardness tester 100. However, the present invention is not limited to this. The present invention may be applied to any hardness tester having an indenter with a known shape. For example, the present invention may also be applied to a Knoop hardness tester having a rhomboid pyramid diamond indenter.

In addition, within a scope not deviating from the substance of the present invention, appropriate modifications may also be made to detailed structures and operations of each component configuring the hardness tester 100.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A hardness tester measuring hardness of a three-dimensional sample by loading a predetermined test force on a surface of the three-dimensional sample with an indenter to form an indentation, and measuring dimensions of the indentation, the hardness tester comprising:
   a memory configured to associate and store a parts program having defined measurement conditions with respect to the three-dimensional sample, including a test position, with an image file including an image of a shape of the three-dimensional sample;
   a camera configured to acquire image data of the three-dimensional sample to be measured;
   a processor configured to:
      perform a pattern matching process, on the image data of the three-dimensional sample acquired by the camera, using the image file associated with the parts program stored in the memory;
      determine, as a result of the pattern matching process, whether a pattern matching image file exists, the pattern matching image file having a shape corresponding to the image data of the three-dimensional sample acquired by the camera;
      retrieve, when the processor determines that the pattern matching image file exists, the parts program associated with the image file from the memory; and
   a measurer configured to perform hardness testing on the three-dimensional sample to be measured and measures the hardness of the three-dimensional sample, based on the parts program retrieved,
   wherein the parts program enables replications of a hardness test for the identified shape by logging a procedure for the hardness test, the procedure including at least a test position, one or more measurement conditions, and a test force to be applied,
   wherein the parts program corresponds to the shape of the three-dimensional sample, and
   wherein the parts program is retrieved automatically, by the processor, upon successful pattern matching process of the image data.

2. The hardness tester according to claim 1, wherein:
the processor is further configured to determine whether an image file having a shape matching the image data of the three-dimensional sample acquired by the camera exists, and
when the processor determines that the image file having a matching shape exists, the processor retrieves the parts program associated with the image file having the matching shape from the memory.

3. The hardness tester according to claim 2, wherein, when an image file having a similar shape to the image data of the three-dimensional sample acquired by the camera exists, the processor determines that the image file having the matching shape exists.

4. The hardness tester according to claim 1, wherein, when the processor determines that there are a plurality of image files having the shape corresponding to the image data of the three-dimensional sample, the processor retrieves from the memory a parts program selected by an operator from among a plurality of parts programs associated with the plurality of image files.

5. The hardness tester according to claim 1, wherein:
   in a case where there are a plurality of image files having the shape corresponding to the image data of the three-dimensional sample acquired by the camera, the processor determines whether an image file having related sample data other than the shape for the three-dimensional sample exists among the plurality of image files, and
   in a case where the processor determines that the image file having related sample data other than the shape for the three-dimensional sample exists, the processor retrieves a parts program associated with the image file having related sample data other than the shape from the memory.

6. A hardness testing method of a hardness tester measuring hardness of a three-dimensional sample by loading a predetermined test force on a surface of the three-dimensional sample with an indenter to form an indentation, then measuring dimensions of the indentation, the hardness testing method comprising:
   acquiring image data of the three-dimensional sample to be measured;
   performing a pattern matching process, on the image data of the three-dimensional sample acquired in the image acquisition, using an image file associated with a parts program having measurement conditions including test position defined with respect to the three-dimensional sample, the image file including an image of a shape of the three-dimensional sample;
   determining, as a result of the pattern matching process, whether a pattern matching image file exists, the pattern matching image file having a shape corresponding to the image data of the three-dimensional sample;
   retrieving, when the processor determines that the pattern matching image file exists; and
   performing hardness testing on the three-dimensional sample to be measured based on the parts program retrieved, and measuring the hardness of the three-dimensional sample,
   wherein the parts program enables replications of a hardness test for the identified shape by logging a procedure for the hardness test, the procedure including at least a test position, one or more measurement conditions, and a test force to be applied,
   wherein the parts program corresponds to the shape of the three-dimensional sample, and
   wherein the parts program is retrieved automatically, by the processor, upon successful pattern matching process of the image data.

* * * * *